United States Patent [19]

Cameron

[11] Patent Number: 5,384,833
[45] Date of Patent: Jan. 24, 1995

[54] VOICE-OPERATED SERVICE

[75] Inventor: Ian R. Cameron, Ipswich, England

[73] Assignee: British Telecommunications public limited company, London, England

[21] Appl. No.: 238,414

[22] Filed: May 5, 1994

Related U.S. Application Data

[63] Continuation of Ser. No. 613,586, filed as PCT/GB89/00445, Apr. 26, 1989, abandoned.

[30] Foreign Application Priority Data

Apr. 27, 1988 [GB] United Kingdom .................. 8809898

[51] Int. Cl.⁶ .................................... H04M 1/65
[52] U.S. Cl. ...................... 379/67; 379/88; 381/43
[58] Field of Search .............. 379/67, 88, 89; 381/41, 381/42, 43

[56] References Cited

U.S. PATENT DOCUMENTS

| | | | |
|---|---|---|---|
| 4,292,471 | 9/1981 | Kuhn et al. | 381/42 |
| 4,363,102 | 12/1982 | Holmgren et al. | 381/42 |
| 4,590,605 | 5/1986 | Hataoka et al. | 381/43 |
| 4,731,811 | 3/1988 | Dubus | 379/58 |
| 4,837,804 | 1/1989 | Akita | 379/88 |
| 4,837,831 | 6/1989 | Gillick et al. | 381/42 |
| 4,922,538 | 5/1990 | Tchorzewski | 379/88 |
| 5,007,081 | 4/1991 | Schmuckal et al. | 379/88 |

OTHER PUBLICATIONS

"An Approach To Text-Independent Speaker Recognition with Short Utterances" K. P. Li, E. H. Wrench, Jr., ICASSP83 Boston.
ICASSP'81 (IEEE International Conference on Acoustics, Speech And Signal Processing, Atlanta, Ga., 30th Mar.-1st Apr. 1981), vol. 1, IEEE, pp. 180–183, New York, US; T. C. Diller et al.: "Speaker-Independent Word Recognition Using Sex-Dependent Clustering" * Abstract *.
Bell Laboratories Record, vol. 50, No. 8, Sep. 1972, pp. 254–259, Murray Hill, US; R. C. Lummis: "Speaker Verification: A Step Toward the 'Checkless' Society" * P. 254, right-hand column, lines 5–11 *.
Electronics, vol. 54, No. 2, 27th Jan. 1981, pp. 53, 55, New York, US; P. Hamilton: "Just a Phone Call Will Transfer Funds" * Whole article *.
ICASSP'81 (IEEE International Conference On Acoustics, Speech And Signal Processing, Atlanta, US, 30th Mar.–1st Apr.), vol. 1, IEEE, pp. 184–187, New York, US; A. E. Rosenberg et al.: "Speaker Identification and Verification Combined With Speaker Independent Word Recognition" * Fig. 1 *.
1978 Wescon Technical Papers, vol. 22, 1978, pp. 28/3-1–28/3-6, Electronic Conventions, Inc., El Segundo, Calif., US; G. R. Doddington: "Voice Authentication Parameters and Usage" * p. 28/3-1, left--hand column, lines 37-48, p. 28/3-4, left-hand column, lines 30–32 *.
European Conference On Speech Technology, vol. 2, Sep. 1987, pp. 460–463, Edingurgh, GB; N. Fakotakis et al.: "Optimum Reference Construction and Updating For Speaker Recognition Systems" * pp. 461, 462: Updating of the Reference Data *.

*Primary Examiner*—Curtis Kuntz
*Assistant Examiner*—Huyen D. Le
*Attorney, Agent, or Firm*—Nixon & Vanderhye

[57] ABSTRACT

In a system for allocating a user identifier to a user of a voice-operated service, the user is requested (20) to utter words in a set of requested words. A speech recognizer (2) compares (24) each received word with a set of speech recognition templates, each template corresponding to the requested words. For each word uttered the speech recognizer generates (26) codes (W1, W2) which are the first and second best matched templates, and further generates (28) scores (D1, D2) indicating the extent of deviation of the received uttered words from the first and second best matched templates. The speech recognizer (2) then computes (32) a reliability criterion for each word by subtracting the scores (D1, D2) and comparing (34) the subtraction result with a threshold. Words having the greatest reliability criterion above the threshold are selected for the user identifier.

18 Claims, 2 Drawing Sheets

VOICE-OPERATED SERVICE

This is a continuation of application Ser. No. 07/613,586, filed as PCT/GB89/00445, Apr. 26, 1989, now abandoned.

BACKGROUND

The present invention relates to voice-operated services, for example services (such as home banking) which may be offered on a telephone network. In particular, the invention concerns allocation and recognition of user identifiers which a user must enter in order to identify himself or herself to the apparatus operating the service.

SUMMARY

In a system for allocating a user identifier to a user of a voice-operated service, the user is requested to utter words in a set of requested words. A speech recognizer compares each received word with a set of speech recognition templates, each template corresponding to the requested words. For each word uttered the speech recognizer generates codes (W1, W2) which are the first and second best matched templates, and further generates scores (D1, D2) indicating the extent of deviation of the received uttered words from the first and second best matched templates. The speech recognizer then computes a reliability criterion for each word by subtracting the scores (D1, D2) and comparing the subtraction result with a threshold. Words having the greatest reliability criterion above the threshold are selected for the user identifier.

The present invention in its various aspects is defined in the claims.

Note that the word "template" is used to signify data representing the sound of a word, with which a comparison can be made; it is not intended to imply any particular type of speech recognition.

DETAILED DESCRIPTION OF THE DRAWINGS

The apparatus shown in the figure forms part of the control equipment of a telephone banking service. A telephone line 1 is connected to a speech recogniser 2 and a speech synthesizer 3. A controller 4 (e.g. a microprocessor system or other digital computer) can transfer commands to the synthesizer 3 to cause desired words to be uttered and receives data output from the recogniser 2.

The recogniser, of conventional design, compares words received over the telephone line with a set of templates and produces at its data output (i) a code W1 indicating the template which most closely matches
(ii) a code W2 indicating the next closest template
(iii) scores D1, D2 indicating the goodness of fit between the word and those two templates.

In order to use the service, an initial log-on procedure requires the user to identify himself or herself by uttering a plurality of words, preferably a series of digits, though other words could of course be used. A five digit log-on number is hereafter assumed. The resulting codes W1 are received by the controller 4 and thus identify the user. Further steps (with which we are not here concerned) then follow; for example the checking of a personal identify number (PIN)—for which of course speaker dependent recognition (i.e. using templates specific to the particular user) may now be employed. Speaker independent recognition of course must necessarily be used to recognise the log-on number.

The aspect of the system with which we are here particularly concerned is the allocation of the log-on number for a new user, the object being to avoid digits which represent a high probability of mis-recognition during subsequent log-on procedures.

Figure 1:
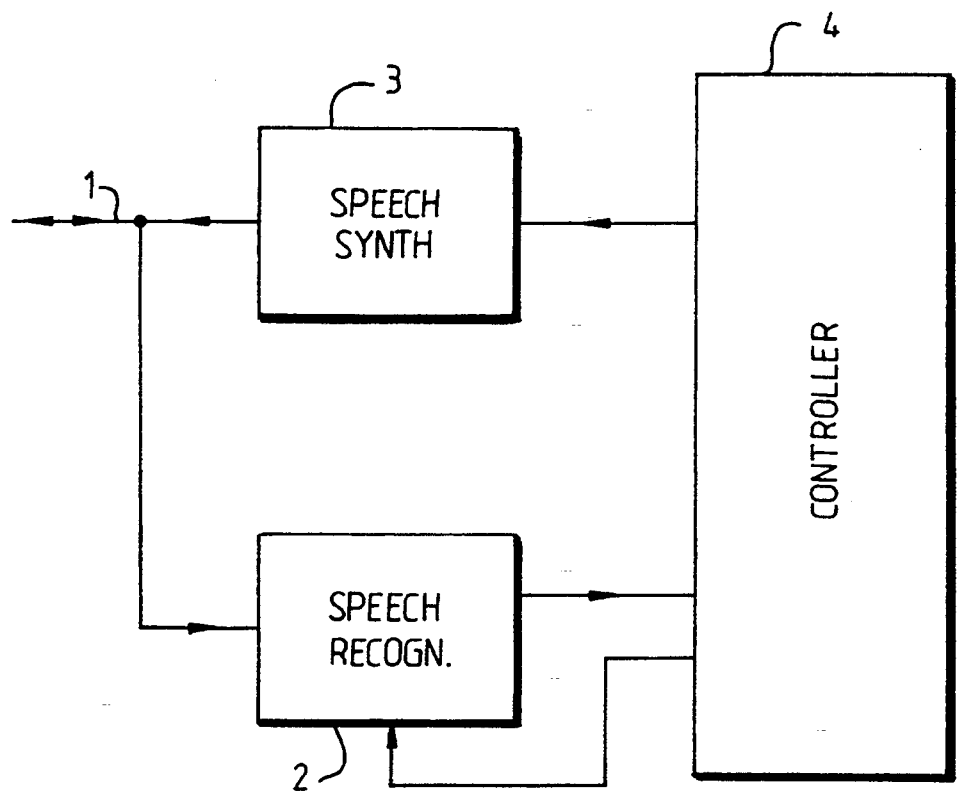
FIG. 1 is a schematic view of apparatus for allocating a user identifier to a user of a voice operated service.
Figure 2:
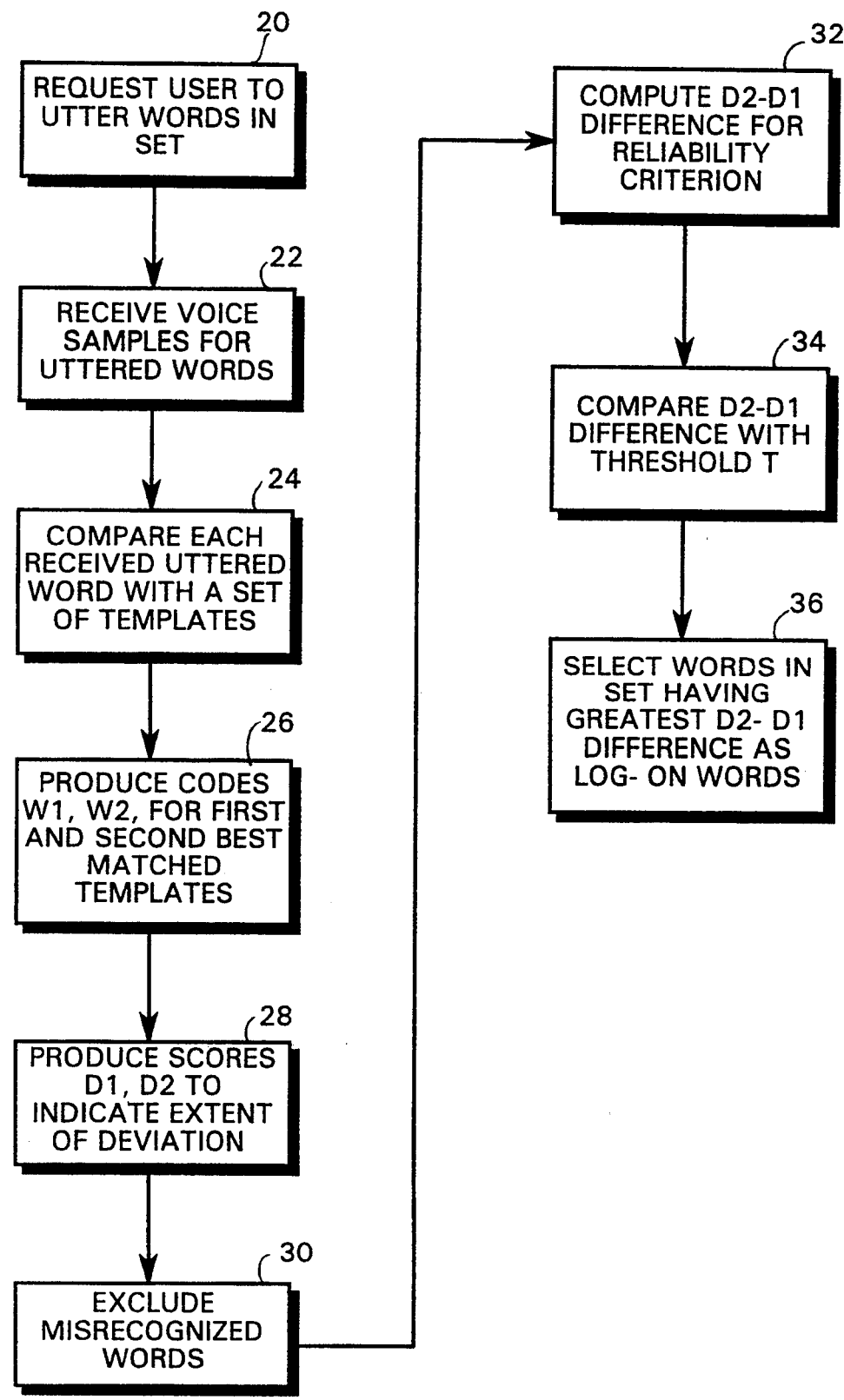
FIG. 2 is a schematic view showing steps executed by the apparatus of FIG. 1 for allocating a user identifier.

The user is asked to utter the words one, two, three, four, five, six, seven, eight and nine (step 20, FIG. 2). These voice samples along with any other desired words, may be recorded for the formation of templates for speaker-dependent recognition. For present purposes, however, they are passed (step 22, FIG. 2) to the speech recogniser 2, which compares each received uttered word with the set of templates (step 24, FIG. 2) and produces, for each word, the codes W1 and W2, and scores D1, D2 as indicated in table 1 below (step 26, 28)

TABLE 1

|    | one | two | three | ... | nine |
|----|-----|-----|-------|-----|------|
| W1 | 1   | 3   | 3     | ... | ...  |
| W2 | 4   | 2   | 4     | ... | ...  |
| D1 | 18  | 34  | 21    | ... | ...  |
| D2 | 25  | 29  | 42    | ... | ...  |

The codes shown for W1, W2 are simply the actual numbers which are deemed by the recogniser to have been recognised. The scores are numbers, on an arbitrary scale, indicating the extent of deviation of the received word from the template; thus a low score indicates a good match whilst a high score indicates a poor match. The scores given are assumed to be actual results for a particular user. Looking at the example given in Table 1, it can be seen that the words, "one" and "three" have been correctly recognised, whilst the word "two" has been mistaken for "three".

The controller 4, having received this data applies certain criteria to ascertain which digits (if any) offer such poor reliability of recognition that they should be excluded from the log-on number (step 30). For the example user of Table 1, the word two is rejected since mis-recognition has actually occurred. However the remaining digits are also examined (step 32). For reliable recognition, what is important is not that the score obtained should be low, but that the score obtained with the "correct" template is significantly better than with the second choice template. Thus in the example the word "three" has scores of 21 and 42 and will therefore be more reliably recognised than "one" where the scores, though lower, are similar and mis-recognition may occur. Thus, in this embodiment, the criterion applied is that (D2−D1) is greater than some threshold T.

The controller 4, computes the difference (D2−D1) for each digit, compares the differences with the threshold T and rejects any digits which do not meet the criterion. It then allocates to the user a five-digit log-on number none of whose digits is one which has failed to meet the criterion. Clearly, if more acceptable digits are available than are needed, it is preferable to use those with the larger differences. This allocation can be in accordance with any convenient procedure—e.g., selection of the next unused number which does not contain a rejected digit.

The threshold T can be selected on the basis of experience at a level falling between one at which digits are rarely rejected and one at which many digits are consistently rejected. With a practical selection for T it may occur, with users having particularly poor diction, that eight or even nine digits are rejected. Therefore, the controller may reduce the threshold T for that particular user down to a level such that a desired minimum number of digits meet the criterion - for example, it may be decided that a five-digit log-on number should contain at least three mutually different digits.

Two modifications to this procedure will now be described. In the first, it is assumed that the controller, when operating a log-on procedure, is capable of resolving ambiguities in recognition—i.e., a situation where scores D1 and D2 are the same or differ by a small amount (say 5)—by offering the first choice back to the user (via the speech synthesizer 3) and asking for confirmation, and, if this is not forthcoming, offering the second choice. (Such arrangements are the object of our pending UK patent application No. 2192746A).

In order to allow in extreme cases the use of digits which are incorrectly recognised (but where the second choice is correct) during the allocation procedure, the criterion is modified as follows:

(i) if neither the first nor second best score is incorrect, is given a zero rating;
(ii) if the first is correct, the rating is defined as (D2−D1)+5 (i.e., occupying a rating range from 5 upwards);
(iii) if the second is correct, the rating is defined as 5(D2−D1): a negative result is deemed to be zero (i.e. those cases where the difference is less than 5 occupy the rating range from 1 to 4).

The rating is then compared with the threshold value, in the same manner as previously.

In the second modification, cognisance is taken of the fact that recognition may be improved by using different templates for male and female speakers. In this case, during the allocation process, speech recognition scores are obtained using both sets of templates. The controller determines which set gives the best results (i.e. which set gives the largest (D1−D2) values, or which set gives measures which are in general larger than does the other) and carries out the remainder of the allocation process using the results from that set only.

If the first digit of the allocated number is chosen to indicate whether the user is male or female, for example by allocating 1, 2 or 3 in the former case and 4, 5 or 7 in the latter, then the recogniser can be arranged during the log-on process to use, for the first digit, male templates for 1, 2 and and female templates for 4, 5 and 7. The set of templates to be used for recognition of the remaining few digits is then determined by the recognition result from the first digit.

I claim:

1. A method of allocating to a user of a voice operated service a user identifier comprising a plurality of words from a set of words, comprising:
   (i) requesting the user to utter the words of the set;
   (ii) comparing each uttered word with a set of speech recognition templates which correspond to the words of the set to obtain a measure of similarity for each uttered word with respect to each template of the set of speech recognition templates;
   (iii) determining which of the words of the set meet a criterion related to a degree to which
      (a) the measure of similarity of an uttered word to a template of said set of templates corresponding to a requested word exceeds
      (b) the measure of similarity of the uttered word to another one of other templates of said set of templates with which the uttered word has the most similarity; and
   (iv) selecting a sequence of words using only words of the set which meet the criterion.

2. A method according to claim 1 wherein the determination step (iii) involves determining whether a difference between the measure of similarity of subparagraph (a) and the measure of similarity of subparagraph (b) exceeds a threshold value.

3. A method according to claim 1 in which:
   (a) each uttered word is compared with a first set of speech recognition templates corresponding to the words of the set and a second set of speech recognition templates corresponding to the words of the set;
   (b) the measures of similarity obtained for the first set of templates is compared with the measure of similarity of the second set of templates to identify the set of templates which gives measures of similarity which are in general more indicative of similarity; and
   (c) the determination as to which words meet the criterion is carried out using the identified set.

4. A method according to claim 3 in which two sets of templates correspond to male and female speech respectively.

5. A method according to claim 3 in which, in the selection of a sequence of words, a first of the words is taken from one of two subsets of the set of words, in dependence on which of the two sets of templates is identified as giving measures of similarity which are more indicative of similarity.

6. An apparatus for operating a voice-operated service comprising a speech recogniser operable to compare each word of a sequence of words supplied thereto with stored templates to obtain a measure of similarity, the templates comprising a first set containing first templates corresponding to each word of a set of words, and a second set containing second templates corresponding to each word of the said set of words, and control means arranged in operation so to control the recognizer that:
   (a) the first word of the sequence is compared with the first templates corresponding to certain predetermined words of the set of words and the second templates corresponding to other words of the set of words;
   (b) the measures of similarity are compared to determine which word of the set of words the said first word of the sequence most closely resembles; and
   (c) subsequent words of the sequence are compared with either the first or the second templates, in dependence on which word of the set of words the said first word of the sequence has been determined as resembling.

7. An apparatus according to claim 6 in which the service is an interactive voice-operated service accessible via a telephone line.

8. A method according to claim 1 in which:

(a) each uttered word is compared with a first set of speech recognition templates corresponding to the words of the set and a second set of speech recognition templates corresponding to the words of the set;
(b) the set of templates for which differences between
  (i) measures of similarities of each uttered word to the corresponding requested word, and
  (ii) measures of similarities of each uttered word to that one of the other templates of that set with which the uttered word has a measure of similarity most indicative of similarity,
  are in general largest is identified; and
(c) the determination as to which words meet the criterion is carried out using the identified set.

9. A method according to claim 8 in which the two sets of templates correspond to male and female speech respectively.

10. A method according to claim 8 in which, in the selection of a sequence of words, the first of the words is taken from one of two subsets of the set of words, in dependence on which of the two sets of templates is identified as giving measures of similarity which are more indicative of similarity.

11. An apparatus for allocating a user identifier to a user of a voice operated service, the user identifier comprising a plurality of words from a set of words, the apparatus comprising:
  means for requesting the user to utter the words of the set and for obtaining uttered words corresponding to the words of the set;
  speech recognition means for comparing each uttered word with a set of speech recognition templates which correspond to the words of the set to obtain a measure of similarity for each uttered word with respect to each template of the set of speech recognition templates;
  control means for determining which of the words of the set meet a criterion related to a degree to which
    (a) the measure of similarity of an uttered word to a template of said set of templates corresponding to a requested word exceeds
    (b) the measure of similarity of the uttered word to another one of other templates of said set of templates with which the uttered word has the most similarity; and
  and for selecting a sequence of words using only words of the set which meet the criterion.

12. The apparatus of claim 11 wherein the control means determines whether a difference between the measure of similarity of subparagraph (a) and the measure of similarity of subparagraph (b) exceeds a threshold value.

13. The apparatus of claim 11, wherein:
(a) the speech recognizer means compares each uttered word with a first set of speech recognition templates corresponding to the words of the set and to a second set of speech recognition templates corresponding to the words of the set;
(b) the control means compares the measures of similarity for the first set of templates with the measures of similarity of the second set of templates to identify the set of templates which gives measures of similarity which are in general more indicative of similarity; and
(c) the determination by the control means as to which words meet the criterion is carried out using the identified set.

14. The apparatus of claim 13, in which the first set of templates correspond to speech of a first gender and the second set of templates correspond to speech of a second gender.

15. The apparatus of claim 13, wherein, in the selection of a sequence of words by the control means, a first of the words is taken from one of two subsets of the set of words, in dependence on which of the two sets of templates is identified as giving measures of similarity which are more indicative of similarity.

16. The apparatus of claim 11, wherein
(a) the control means compares each uttered word with a first set of speech recognition templates corresponding to the words of the set and a second set of speech recognition templates corresponding to words of the set;
(b) the control means identifies the set of templates for which differences between
  (i) measures of similarities of each uttered word to the corresponding requested word, and
  (ii) measures of similarities of each uttered word to that one of the other templates of that set with which the uttered word has a measure of similarity most indicative of similarity,
  are in general largest; and
(c) the determination by the control means as to which words meet the criterion is carried out using the identified set.

17. The apparatus of claim 16, in which the first set of templates correspond to speech of a first gender and the second set of templates correspond to speech of a second gender.

18. The apparatus of claim 16, wherein, in the selection of a sequence of words by the control means, a first of the words is taken from one of two subsets of the set of words, in dependence on which of the two sets of templates is identified as giving measures of similarity which are more indicative of similarity.

* * * * *